(12) United States Patent
Gramling

(10) Patent No.: US 6,353,951 B1
(45) Date of Patent: Mar. 12, 2002

(54) CUSHIONING COVER FOR A BED LEG

(76) Inventor: Larry Gramling, 30826 21st Ave. SW., Federal Way, WA (US) 98023

( * ) Notice: Subject to any disclaimer, the term of this patent is extended or adjusted under 35 U.S.C. 154(b) by 0 days.

(21) Appl. No.: 09/722,145

(22) Filed: Nov. 24, 2000

(51) Int. Cl.[7] .............................................. B60B 33/00
(52) U.S. Cl. ................ 5/663; 5/424; 5/658; 248/345.1; 16/18 CG
(58) Field of Search ........................... 5/309, 424, 658, 5/663; 248/345.1; 16/18 CG

(56) References Cited

U.S. PATENT DOCUMENTS 3,381,320 A * 5/1968 Mott ............................... 5/658
4,323,610 A * 4/1982 Leverich ........................ 5/424
5,173,990 A * 12/1992 Owen ........................ 16/18 CG
5,603,140 A * 2/1997 Pryce ........................ 16/18 CG

FOREIGN PATENT DOCUMENTS

CA           2120841 A1 *  8/1994  .................... 5/663

* cited by examiner

Primary Examiner—Michael F. Trettel
(74) Attorney, Agent, or Firm—Delbert J. Barnard

(57) ABSTRACT

A cushioning cover (10) that is initially planar in form is wrapped around a bed frame leg (56). An upper tongue (20) is inserted into and through an upper slot (26). In like fashion, a lower tongue (24) is inserted through a lower slot (28, 30). The tongues (20, 24) have enlarged portions (e.g. 38, 40) that function to lock the tongues (20, 24) into the slots (26, 30). When the cushioning cover (10) is placed on a bed frame leg (56) it provides an outwardly directed wall of cushioning material that will absorb a striking blow imposed on it by a person's toe or toes.

12 Claims, 2 Drawing Sheets

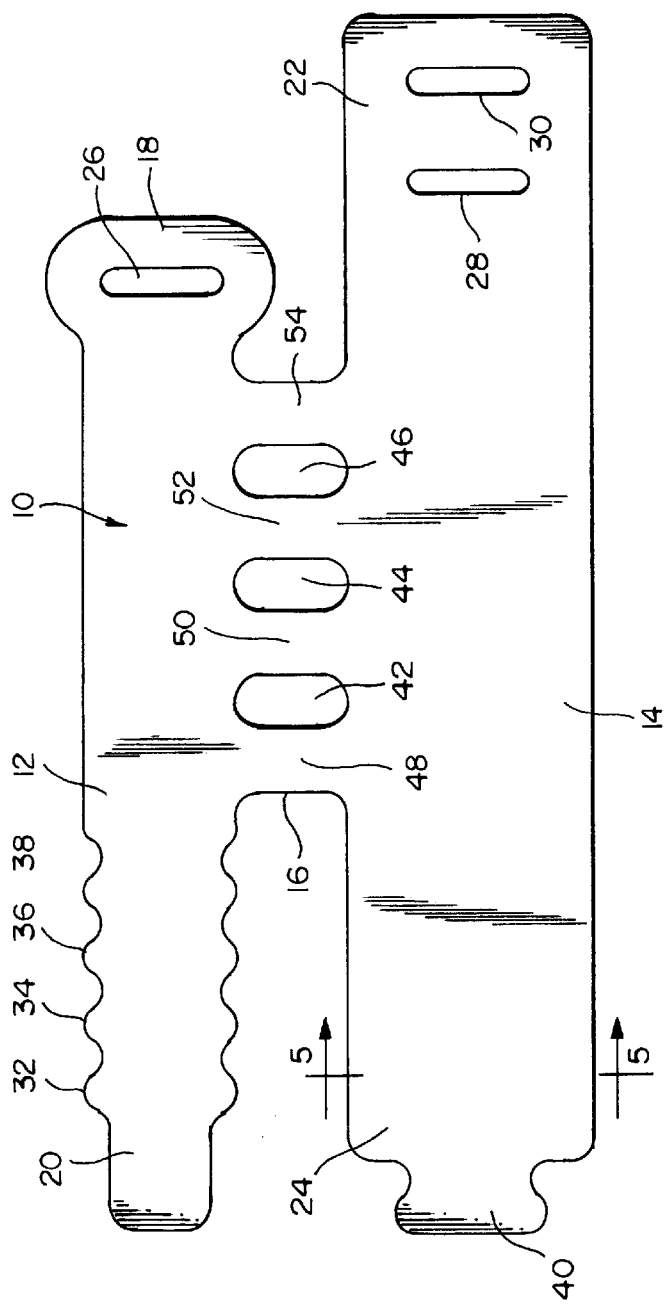
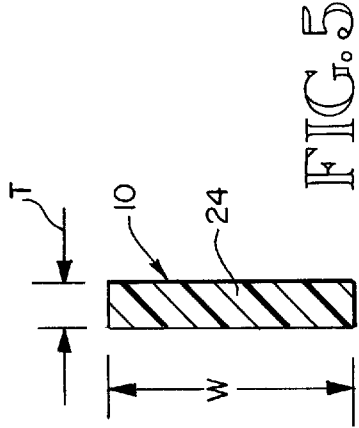

CUSHIONING COVER FOR A BED LEG

TECHNICAL FIELD

This invention relates to providing protection against foot pain and/or injury. More particularly, it relates to the provision of a cushioning cover for a bed frame leg positionable and adapted to absorb the blow of a person's foot that without the cover would contact the bed frame leg.

BACKGROUND OF THE INVENTION

A common form of bed frame has short legs at its four corners and at locations between the corners. These bed frame legs are usually composed of a tubular post that depends downwardly from the bed frame and a roller or caster at the lower end of the post. In many of these bed frames, the legs are positioned where they can be struck by the foot of a person who is walking around the bed or is in the process of getting into or out from the bed. The posts and the rollers are made from a hard substance that can cause considerable pain and sometimes injury to a person's toes who strike them. An object of the present invention is to provide a simple yet effective cushioning cover for the bed frame legs that is adapted to protect against injury to a person's foot caused by a striking contact with a bed frame leg.

BRIEF SUMMARY OF THE INVENTION

The present invention includes the provision of a cushioning cover for a bed frame leg. According to an aspect of the invention, an elongated cushioning member or pad is provided that has first and second ends, a length at least as long as the distance around a bed frame leg, and a width less than the height of the bed frame leg. The first end of the member is adapted to be connected to the second end of the member after the member has been wrapped around a bed frame leg. The member is made from a resilient material that will cushion contact of a person's foot with the bed frame leg.

According to another aspect of the invention, the first end of the member is formed to include at least one transverse slot and a tongue is provided at the second end of the member. Insertion of the tongue into the slot serves to connect the first end to the second end.

According to a further aspect of the invention, the slot has a predetermined length and the tongue has an enlarged portion that is wider than the length of the slot. The tongue is flexible so that it can be distorted in shape as the enlarged portion is moved through the slot. After the tongue has been moved through the slot, the enlarged portion of the tongue will be positioned to hold the tongue against inadvertent removal from the slot.

According to yet another aspect of the invention, the elongated member has an upper strap portion having first and second ends, a lower strap portion having first and second ends, and a connecting portion connecting the upper and lower strap portions together at a location intermediate their ends. Each strap portions has a means for connecting its first end to its second end after the cushion member has been wrapped around a bed frame leg.

In preferred form, at least one transverse slot is formed in the first end of each strap portion and a corresponding tongue is provided at the second end of each strap portion. The insertion of the tongues into the slots will connect the first ends to the second ends. Also in preferred form, each slot has a predetermined length and its tongue has at least one enlarged portion that is wider than the length of the slot. The tongues are flexible enough so that they can be distorted in shape in order to move the enlarged portions through the slots. After the tongues have been moved through the slots, the enlarged portions of the tongues are positioned to hold the tongues against inadvertent removal out from the slots.

Further, in the preferred embodiment, the tongue on the upper strap portion includes a plurality of longitudinally spaced apart enlarged portions. This allows the girth dimension of the upper strap portion of the cover to be adjusted by selectively moving the upper tongue through the upper slot in order to place a selected one of the enlarged portions against the slot. Also in the preferred embodiment, the connecting portion of the member comprises a plurality of spaced apart slots that are between spaced apart strips. The strips and slots allow the intermediate portion of the member to purse when the upper strap portion is tightened around an upper post portion of the bed frame leg that is smaller in width than the lower portion of the leg that is surrounded by the lower strap portion.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and:

FIG. 4 is a plan view showing the cushioning cover in a flat condition; and

FIG. 5 is a sectional view taken substantially along line 55 of FIG. 4.

DETAILED DESCRIPTION OF THE INVENTION

Figure 3:
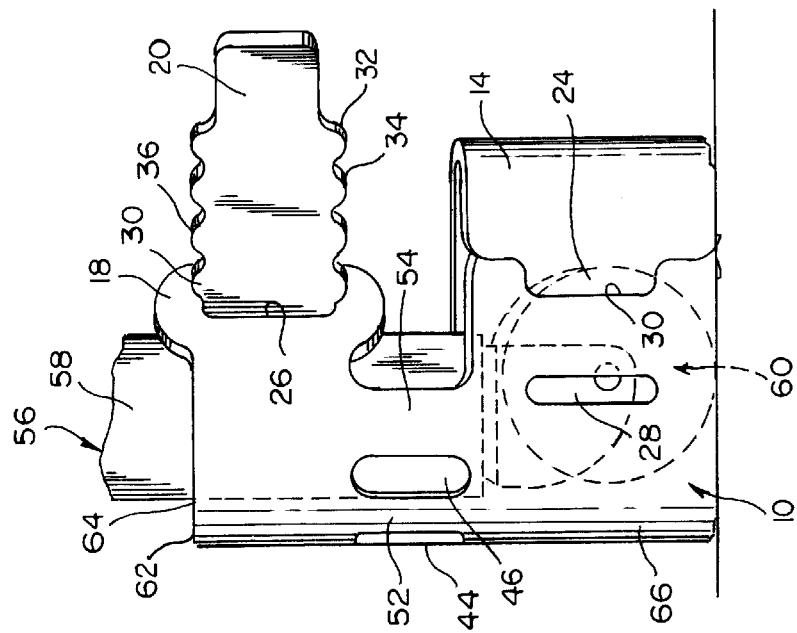
FIG. 3 is a view like FIG. 1, showing the bed leg within the cushioning cover.

Referring to FIGS. 1–5, in preferred form, the cushioning cover 10 of the present invention comprises an elongated flat member that includes an elongated upper strap portion 12, an elongated lower strap portion 14 and an interconnecting intermediate portion 16. The member 10 is die cut, water jet cut, or otherwise cut to the shape shown by FIG. 4. The material used for member 10 is a resilient material measuring, for example, between about 0.2–0.4 inches in thickness. By way of non-limitive example, the material may be a foam plastic such as ARTILON®, and may have a density of 1.7, 2.0 or 3.0 PCF. Member 10 has a length that is at least as long as the distance around a bed frame leg and a width that is less than the height of the bed frame leg. In the illustrated embodiment, shown by FIG. 4, the length is substantially about 11.9 inches and the height in substantially about 5.5 inches.

The upper strap portion 12 includes a first end 18 and a second end 20. The lower strap portion 14 includes a first end 22 and a second end 24. Some sort of means is provided for connecting the first and second ends 18, 22 and 20, 24 of the straps 12, 14 together when the member 10 has been wrapped around a bed frame leg. In the embodiment illustrated, the first end 18 of upper strap portion 14 is formed to include a transverse slot 26 and the first end 22 of the lower strap portion 14 is formed to include a plurality of slots 28, 30. The slots 26, 28, 30 extend crosswise of the strap portions 12, 14. That is, they are elongated in a transverse direction. The second ends 20, 24 are in the nature of elongated tongues 20, 24. In the illustrated embodiment, tongue 20 includes a plurality of selectively usable enlarged portions 32, 34, 36, 38. Tongue 24 includes a single enlarged portion 40. Enlarged portions 32, 34, 36, 38 are wider than the slot 26 are long. Enlarged portion 40 is wider than the slots 28, 30 is long. The material used to form member 10 is a material that can be distorted in shape so as to allow the enlarged portions to be moved through the slots.

The interconnecting portion 16 of member 10 is preferable formed to include a plurality of slots 42, 44, 46 that extend crosswise of the member 10. The slots 42, 44, 46 are located between strips of material 48, 50, 52 and 54 which connect strap portion 12 with strap portion 14.

Figure 1:
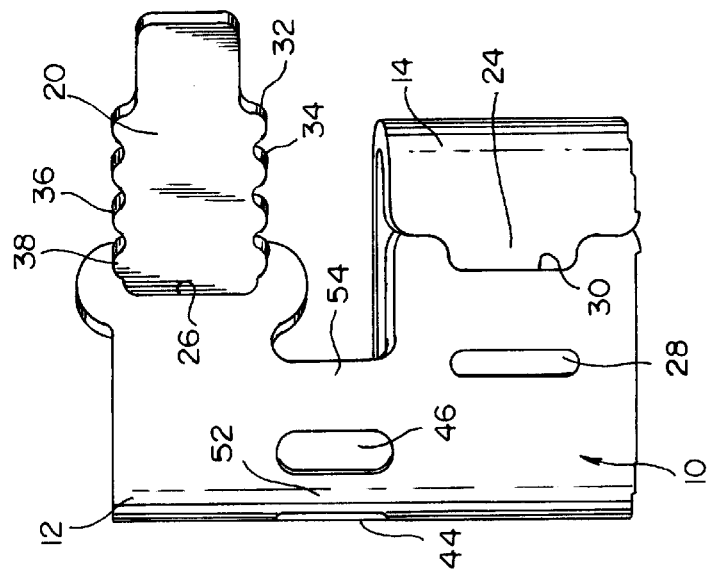
FIG. 1 is a side elevational view of a bed leg cushioning cover in an assembled position but apart from the bed leg.

Referring to FIG. 1, the strap 20 is shown inserted into the slot 26 and is pulled through the slot 26 until enlarged portion 38 is on the outside of slot 36. Tongue 24 is moved through slot 30 until the enlarged end portion 40 is inside the member 10, hidden from view in FIG. 1.

Figure 2:
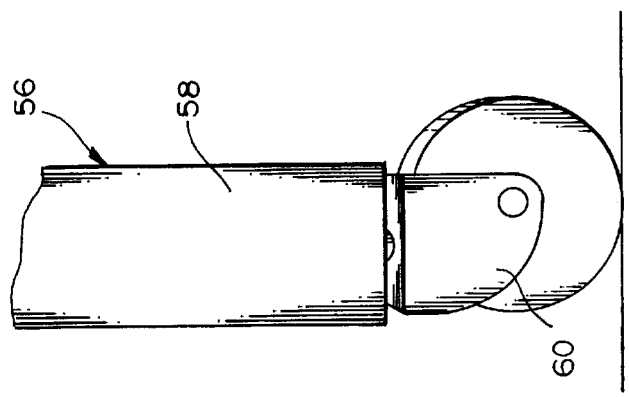
FIG. 2 is a side elevational view of a bed leg comprising a post and a castor at the lower end of the post.

FIG. 2 shows a typical bed frame leg 56. It is shown as comprising a post 58 and a wheel or caster 60 at the lower end of the post 58. FIG. 3 is like FIG. 1 but showing the bed frame leg 56 inside of the cushioning cover 10. One thing that FIG. 3 does not show is the pursing of the upper portion of the cover 10 when the tongue 20 is pulled through the slot 26. Region 62 of member 10 is moved over towards region 64 at the side of post 58. Material strips 48, 50, 52, 54 bend towards the post 58 and the strips 48, 54, in particular may twist in position somewhat. This is done is response to the tongue 20 being pulled through the slot 26 until the opening in the top of the member 10 is much smaller than the opening in the bottom of the member 10. This bending in and twisting is herein referred to as pursing.

The cushioning cover 10 is installed in the following manner. It is brought to the bed frame leg 56 in a flat condition. It is then moved into a position behind the leg 56, with the leg 56 being generally centered with respect to the connecting portion 16. Then, the end portions 22, 24 of the lower strap are pulled, curled and brought together. The end portion 40 is inserted through one or the other of slots 28. In a typical bed frame leg 56, the wheel or caster 60 is longer than it is wide. When the two ends of the lower strap are joined, the opposite ends of the roller 60 substantially make contact with the material 10. Next, the tongue 20 is inserted through the slot 26 and is pulled upon until the upper end portion of the member 10 closely surrounds the post 50. This is when the pursing occurs. Lastly, the assembled cover 10 is rotated in position so as to have its slotted region 16 facing outwardly. This provides a cushioning wall between the leg 56 and a person's foot that may be approaching the leg 56. The upper and lower strap portions 12, 14 and the strips of material 48, 50, 52, 54 form a wide, full height protective wall facing outwardly in the direction from which a person's foot might be traveling towards the leg 56. Assuming that a person's toes are moving towards the leg 56, they will contact this wall of material 10 and the blow of the toes against the leg and cover assembly will be cushioned by the cover. If striking contact is made in the region 16, the toe or toes will contact the strips of material 48, 50, 52, 54.

FIG. 5 shows a thickness dimension T taken at line 5—5 in FIG. 4. This thickness dimension T is the thickness dimension for the entire member 10. As previously stated, the dimension T may be substantially about 0.2 to about 0.4 inches.

The cushioning cover of the present invention is simple in construction, is inexpensive to manufacture and is easy to install and use. Also, it can be made to be attractive, such as by a selection of the material used, the color of the material, the surface texture or cover skin applied to the material, and by geometric designs that may be added to the member 10. Also, the lower strap portion 14 may be wider in the direction W than is necessary in most installations. This would allow the cover 10 to be used with higher than usual bed frame legs 56. Then, if it is necessary to shorten the cover 10, it can be done by cutting a strip of the cover 10 off at the bottom. The slots 28, 30 can be moved upwardly so that the cutting will not cut through them. Also, if the bed frame leg 56 is quite short, the cover 10 may be shortened in height by cutting off the upper strap portion. A strip portion of the upper strap portion 12 may be left above the strips 48, 50, 52, 54 and the slots 42, 44, 46 if the height of the bed frame legs will permit it. Otherwise, cutting can be through the strips 48, 50, 52, 54. If a given cover 10 is to be dedicated to slots 42, 44, 46 and a particular bed frame leg 56, the excess tongue length can be cut off. For example, in FIGS. 1 and 3, the tongue 20 can be cut immediately outwardly of enlarged portion 38.

When the cover 10 is wrapped around a bed frame leg 56 and is connected to it by insertion of the tongues 20, 24 into the slots 26, 28, 30, the cover 10 has a tubular shape with a larger diameter at the bottom than at the top. The caster or wheel 60 has a generally rectangular horizontal cross section. Thus, in the region 66 (FIG. 3) that is facing outwardly from the wheel 60, the wall of material 10 is curved. This curvature adds some stiffness to the wall but because the material 10 is both flexible and resilient, the protective wall will give or move inwardly in response to a striking blow. This movement of the wall of material into the space behind it also helps to cushion the blow of a toe or toes against the material.

The slot and tongue construction is a preferred way of connecting the first and second ends of the strap portions together. However, it is not the exclusive way. The end portions may be connected in a large number of other ways. For example, they may be provided with the two components of a hook and loop connector. Or, snap connectors can be used.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A cushioning cover for a leg of a bed frame, comprising:
an elongated member having first and second ends, a length at least as long as the distance around a bed frame leg, and a width less than the height of the bed frame leg; and
means for connecting the first end to the second end after the member has been wrapped around the bed frame leg, wherein the member is made from a resilient material that will cushion contact of a person's foot with the bed frame leg, wherein at least one transverse slot is formed in the first end of the member and a corresponding tongue is provided at the second end of the member, and wherein insertion of the tongue into the slot will contact the first end to the second end.

2. The cushioning cover of claim 1, wherein the slot has a predetermined length and the tongue has an enlarged portion that is wider than the length of the slot, wherein said tongue is flexible enough that it can be distorted in shape and moved through the slot, and wherein after the tongue has been moved through the slot, the enlarged portion of the tongue is positioned to hold the tongue against inadvertent removal from the slot.

3. A cushioning cover for a leg of a bed frame, comprising:

an elongated member having first and second ends, a length at least as long as the distance around a bed frame leg, and a width less than the height of the bed frame leg; and means for connecting the first end to the second end after the member has been wrapped around the bed frame leg, wherein the member is made from a resilient material that will cushion contact of a person's foot with a bed frame leg, wherein said elongated member has an upper strap portion having first and second ends, a lower strap portion having first and second ends, and a connecting portion connecting the upper and lower strap portions together at a location intermediate their ends, and wherein each strap portion has a means for connecting its first end to its second end after the cushion member has been wrapped around the bed frame leg.

4. The cushioning cover of claim 3, comprising at least one transverse slot formed in the first end of each strap portion and a corresponding tongue provided at the second end of each strap portion, wherein insertion of the tongues into the slots will connect the first ends to the second ends.

5. The cushioning cover of claim 4, wherein each slot has a predetermined length and its tongue has at least one enlarged portion that is wider than the length of the slot, wherein said tongues are flexible enough that they can be distorted in shape and moved through the slots, and wherein after the tongues have been moved through the slots, the enlarged portions of the tongues will hold the tongues against inadvertent removal out from the slots.

6. The cushioning cover of claim 5, wherein the first end of the lower strap portion includes a plurality of longitudinally spaced apart slots, whereby the girth dimension of the cover can be adjusted by selecting a slot into which the lower tongue can be inserted.

7. The cushioning cover of claim 6, wherein the tongue on the upper strap portion includes a plurality of longitudinally spaced apart enlarged portions, wherein the girth dimension of the upper strap portion of the cover can be adjusted by selectively moving the upper tongue through the upper slot in order to place a selected one of the enlarged portions adjacent the slot.

8. The cushioning cover of claim 3, wherein the connecting portion comprises a plurality of strips separated by slots, wherein the strips and the slots extend substantially perpendicular to the upper and lower straps.

9. The cushioning cover of claim 8, comprising at least one transverse slot formed in the first end of each strap portion and a corresponding tongue provided at the second end of each strap portion, wherein insertion of the tongues into the slots will connect the first ends to the second end.

10. The cushioning cover of claim 4, wherein each slot has a predetermined length and its tongue has at least one enlarged portion that is wider that the length of the slot, wherein said tongues are flexible enough that they can be distorted in shape and moved through the slots, and wherein after the tongues have been moved through the slots, the enlarged portions of the tongues will hold the tongues against inadvertent removal out from the slots.

11. The cushioning cover of claim 10, wherein the first end of the lower strap portion includes a plurality of longitudinally spaced apart slots, whereby the girth dimension of the cover can be adjusted by selecting a slot into which the lower tongue can be inserted.

12. The cushioning cover of claim 11, wherein the tongue on the upper strap portion includes a plurality of longitudinally spaced apart enlarged portions, wherein the girth dimension of the upper strap portion of the cover can be adjusted by selectively moving the upper tongue through the upper slot in order to place a selected one of the enlarged portions adjacent the slot.

* * * * *